United States Patent

Yamada et al.

[11] Patent Number: 5,423,366
[45] Date of Patent: * Jun. 13, 1995

[54] HEAVY DUTY RADIAL TIRE WHEREIN BEAD TOE LIFTING IS PREVENTED

[75] Inventors: Munemitsu Yamada, Akashi; Atsushi Yamahira, Nishinomiya, both of Japan

[73] Assignee: Sumitomo Rubber Industries, Ltd., Kobe, Japan

[*] Notice: The portion of the term of this patent subsequent to Jan. 11, 2011 has been disclaimed.

[21] Appl. No.: 945,704

[22] Filed: Sep. 16, 1992

[30] Foreign Application Priority Data

Sep. 17, 1991 [JP] Japan .................. 3-267043

[51] Int. Cl.⁶ .................. B60C 3/00; B60C 9/02; B60C 15/02; B60C 15/04
[52] U.S. Cl. .................. 152/454; 152/539; 152/540; 152/548
[58] Field of Search .......... 152/539, 540, 544, 542, 152/543, 546, 454, 548; 245/1.5

[56] References Cited

U.S. PATENT DOCUMENTS

| | | | |
|---|---|---|---|
| 4,192,368 | 3/1980 | Maiocchi | 152/540 |
| 4,319,622 | 3/1982 | Iuchi et al. | 152/540 |
| 4,387,758 | 6/1983 | Matsuda et al. | 152/454 |
| 4,408,648 | 10/1983 | Ohashi | 152/544 |
| 5,025,844 | 6/1991 | Ueda et al. | 152/454 |
| 5,277,237 | 1/1994 | Tagashira | 152/539 X |

FOREIGN PATENT DOCUMENTS

| | | |
|---|---|---|
| 0013194 | 7/1980 | European Pat. Off. . |
| 1127147 | 12/1956 | France . |
| 1394941 | 2/1964 | France . |
| 2374173 | 7/1978 | France . |
| 2658126 | 8/1991 | France . |
| 2187146 | 9/1987 | United Kingdom . |

OTHER PUBLICATIONS

Patent Abstracts of Japan vol. 7, No. 217 (M-245) (1362) 27 Sep. 1983 & JP-A-58 112 810 (Yokohama Gomu K.K.) Jul. 1983.

*Primary Examiner*—Adrienne Johnstone

[57] ABSTRACT

A heavy duty radial tire improved in bead durability and airtightness, which comprises a pair of axially spaced bead portions having a bead base to fit with a 15° tapered bead seat of its regular rim, and a bead core disposed in each of the bead portions, the bead core having a polygonal cross sectional shape having an axially inner vertex point (Q1) and an axially outer vertex point (Q2) and a side (L1) extending between the points (Q1 and Q2), the side (L1) being adjacent to and substantially parallel with the bead base, the maximum section width (CW) of the bead core in the direction parallel with the side (L1) being in the range of 0.063 to 0.105 times the rim width (RW) between the bead heel points (P), the axial distance (A) of the axially inner point (Q1) from the bead heel point (P) being 0.073 to 0.125 times the rim width (RW).

6 Claims, 8 Drawing Sheets

HEAVY DUTY RADIAL TIRE WHEREIN BEAD TOE LIFTING IS PREVENTED

The present invention relates to a heavy duty radial tire, in which bead durability and airtightness are improved.

BACKGROUND OF THE INVENTION

For heavy vehicles, e.g. bus, truck and the like, tubeless tires are widely used.

Figure 10:
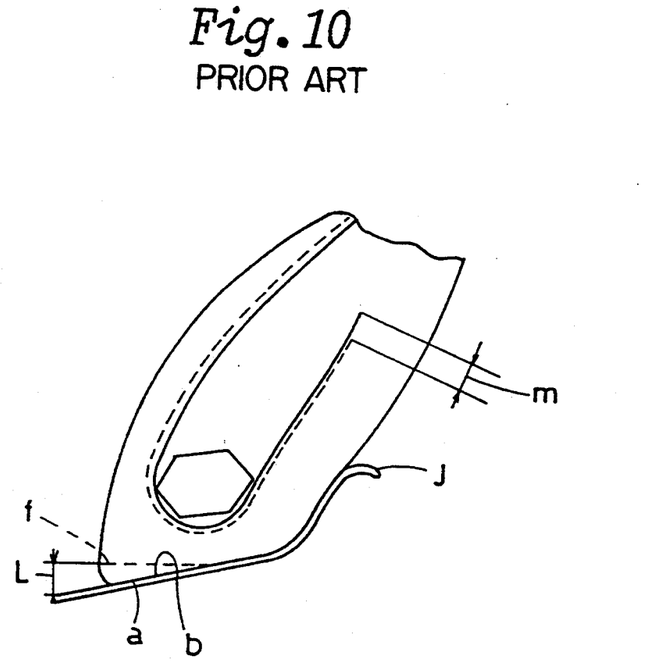
FIG. 10 is a cross sectional view showing a prior art tire.

In such a heavy duty tire, the engaging force between the tire beads and the bead seats of the rim must be large to maintain airtightness. This is particularly important when the tire load and inner pressure are very large. However, as shown in FIG. 10, so called bead toe lifting (f), a phenomena that the bead toe (a) is lifted from the bead seat (b) though the tire is mounted on its regular rim and inflated to a normal pressure and loaded by a normal load, was often observed.

Figure 9:
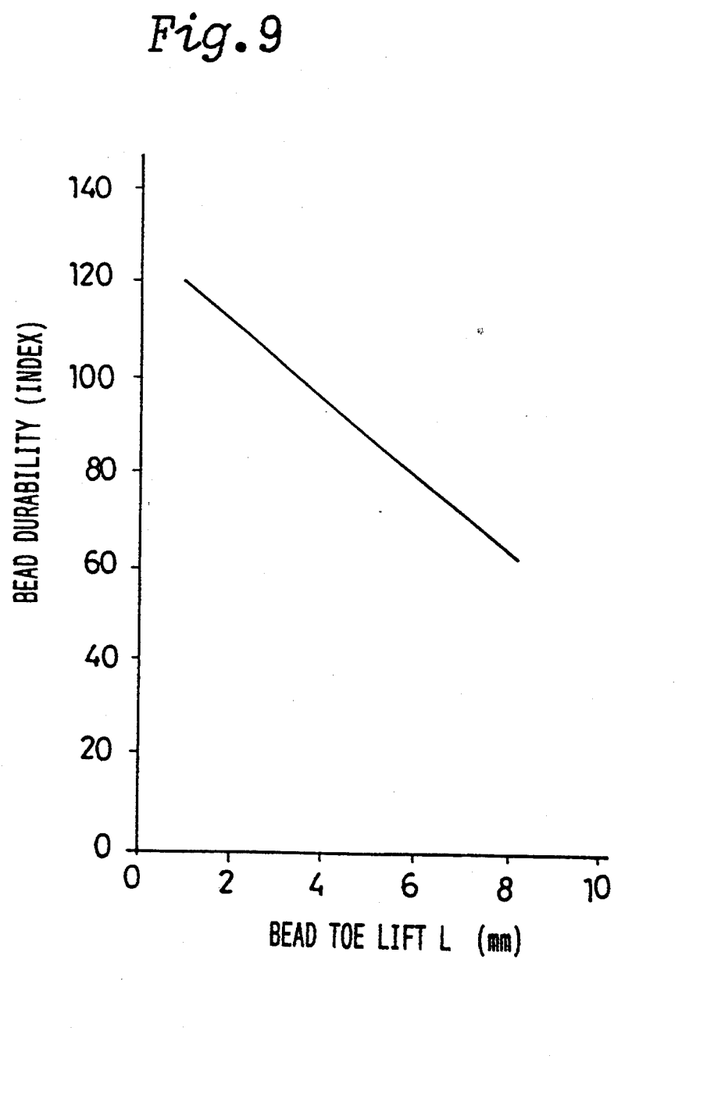
FIG. 9 is a graph showing bead durability as a function of the amount of bead toe lifting.

It was found that such a toe lifting reduces not only the airtightness but also bead durability. Further, it was found that the bead durability decreases in proportion to the increase in the amount (L) of the bead toe lifting (f) as shown in FIG. 9.

In the tires in which bead toe lifting occurred, the larger the service pressure, the greater the bead toe lifting. Accordingly, the deformation of the bead portion was larger, and damage occurred earlier.

In the bead portion, the tensile stress of the carcass produced by the tire inner pressure is generally radially outward and axially outward. Therefore, in the ground contacting patch of the tire, the bead core is forced toward the rim flange by the axial component of the tensile stress, which component is in direct proportion to the amount of tire deflection. On the other hand, the radial component of the tensile stress of the carcass increases as the measuring position is circumferentially apart or away from the ground contacting patch, and the axially inside of the bead core is forced radially outwardly. The direction of the resultant force to which the bead core is subjected is changed during running. Therefore, the axially outward bead rubber portion is compressed axially by the axially outward movement of the bead core and radially by the radially inward movement of the carcass turned up portion. On the other hand, the axially inward bead rubber portion is pulled by the carcass main portion. As a result, under a heavy load and high pressure condition, the bead rubber is subjected a repeated large stress, and the rubber is permanently deformed. Accordingly, the airtightness between the tire beads and bead seats of the rim are decreased. Further, such permanently deformed rubber is liable to be cracked especially at points in the radially outward bead rubber portion near the carcass ply turnup edge and the radially outer edge of the rim flange. The bead durability is greatly decreased by such a crack.

SUMMARY OF THE INVENTION

It is therefore, an object of the present invention to provide a heavy duty radial tire, in which, by preventing the bead toe lifting, the airtightness and bead durability are improved.

According to one aspect of the present invention, a heavy duty radial tire comprises a tread portion having tread edges, a pair of axially spaced bead portions having a bead base to fit with a 15° tapered bead seat of its regular rim, a pair of sidewall portions extending between the tread edges and the bead portions, a bead core disposed in each of the bead portions and having a polygonal cross sectional shape, a radial carcass extending between the bead portions and turned up around the bead cores, and a belt disposed radially outside the carcass and radially inside the tread portion, the polygonal cross sectional shape of the bead core having an axially inner vertex point (Q1) and an axially outer vertex point (Q2) and a side (L1) extending between the points (Q1 and Q2), the side (L1) being adjacent to and substantially parallel with the bead base, the maximum section width (CW) of the bead core in the direction parallel with the side (L1) being in the range of 0.063 to 0.105 times the rim width (RW), the rim width (RW) being defined as the distance between the bead heel points (P), the axial distance (A) of the axially inner point (Q1) from the bead heel point (P) being 0.073 to 0.125 times the rim width (RW).

BRIEF DESCRIPTION OF THE DRAWINGS

An embodiment of the present invention will now be described in detail in conjunction with the accompanying drawings, in which.

DESCRIPTION OF THE INVENTION

In FIGS. 1-5, a heavy duty radial tire 1 according to the invention is a tubeless truck-bus radial tire.

Figure 1:
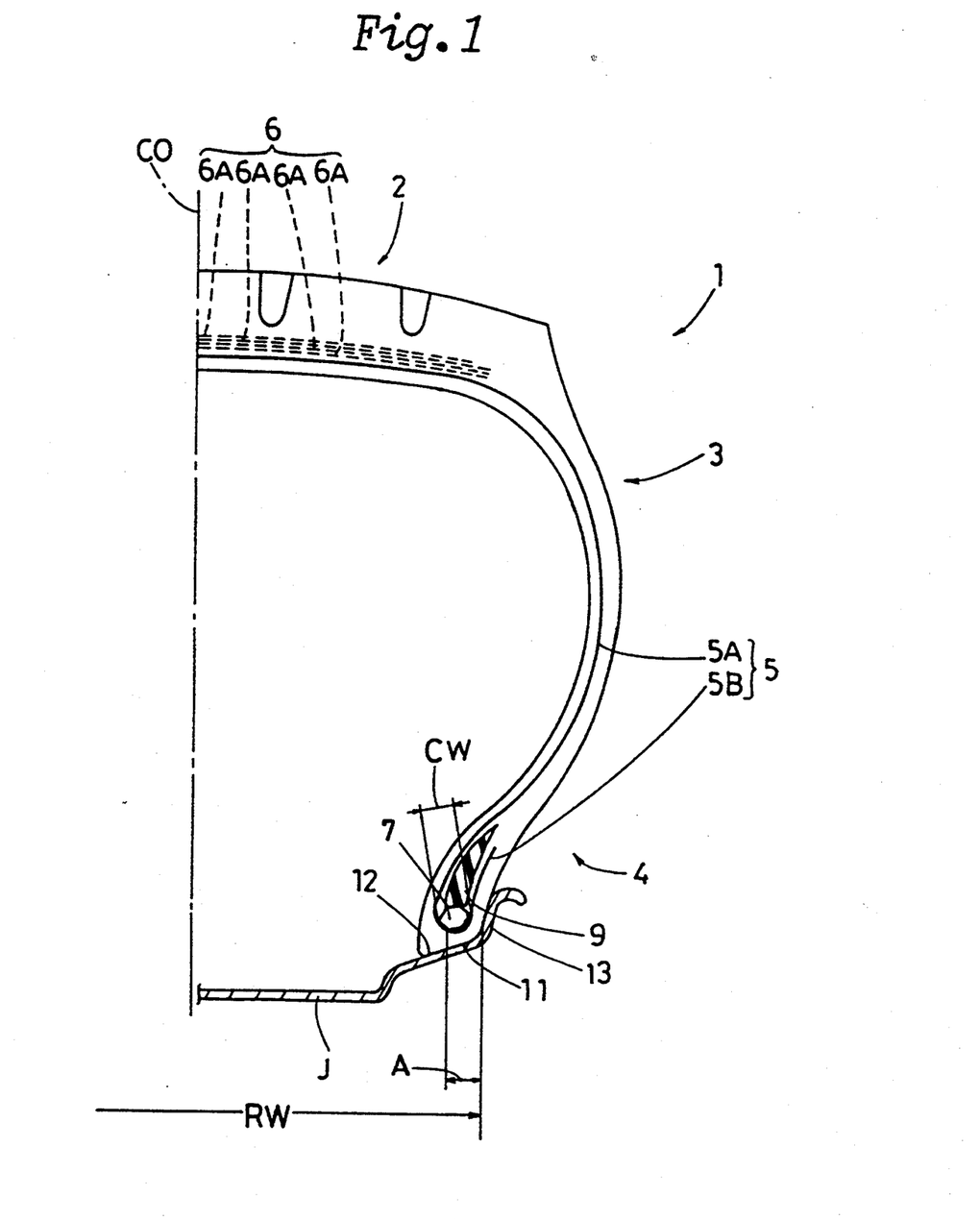
FIG. 1 is a cross sectional view showing a right half of a tire according to the present invention.

The tire 1 has a tread portion 2, a pair of axially spaced bead portions 4, and a pair of sidewall portions 3 extending between the tread edges and the bead portions 4.

The tire 1 comprises a pair of bead cores 7 disposed one in each of the bead portions 4, a carcass 5 extending between the bead portions and turned up around the bead cores 7 from the axially inside to the outside to form a pair of turned up portions 5B and a main portion 5A therebetween, and a belt 6 comprising a plurality of plies, in this embodiment four plies 6A, disposed radially outside the carcass 5 and inside a rubber tread 2.

FIG. 1 shows a normally inflated condition when the tire 1 is mounted on its regular rim (J) and inflated to its regular inner pressure.

The rim J is a center dropped 15° taper rim, which comprises a pair of bead seats 12 each tapered toward the center of the rim at substantially 15 degrees, a well for tire mounting between the bead seats 12, and a pair of low flanges 13 each extending radially outwardly from the axially outer edge of each bead seat 12.

The carcass 5 is made of cords arranged radially at 60 to 90 degrees with respect to the tire equator CO.

For the carcass cords, organic fiber cords, e.g. nylon, polyester, aromatic polyamide, aromatic polyester, rayon and the like, carbon fiber cords, or steel cords can be used.

Each belt ply 6A comprises the belt cords arranged parallel, each other, and at least two belt plies are arranged to cross each other and also to cross the carcass ply, whereby a triangular construction is formed by the belt cords and carcass cords to reinforce the tread portion 2 of the tire.

For the belt cords, organic fiber cords, e.g. aromatic polyamide, aromatic polyester, nylon, polyester, rayon and the like or steel cords are used.

Preferably, each turned up portion 5B of the carcass 5 has a radially outer edge K extending radially outwardly over the radially outer edge F of the flange 13 of the rim J by a radial distance of 25 to 50 mm.

Figure 2:
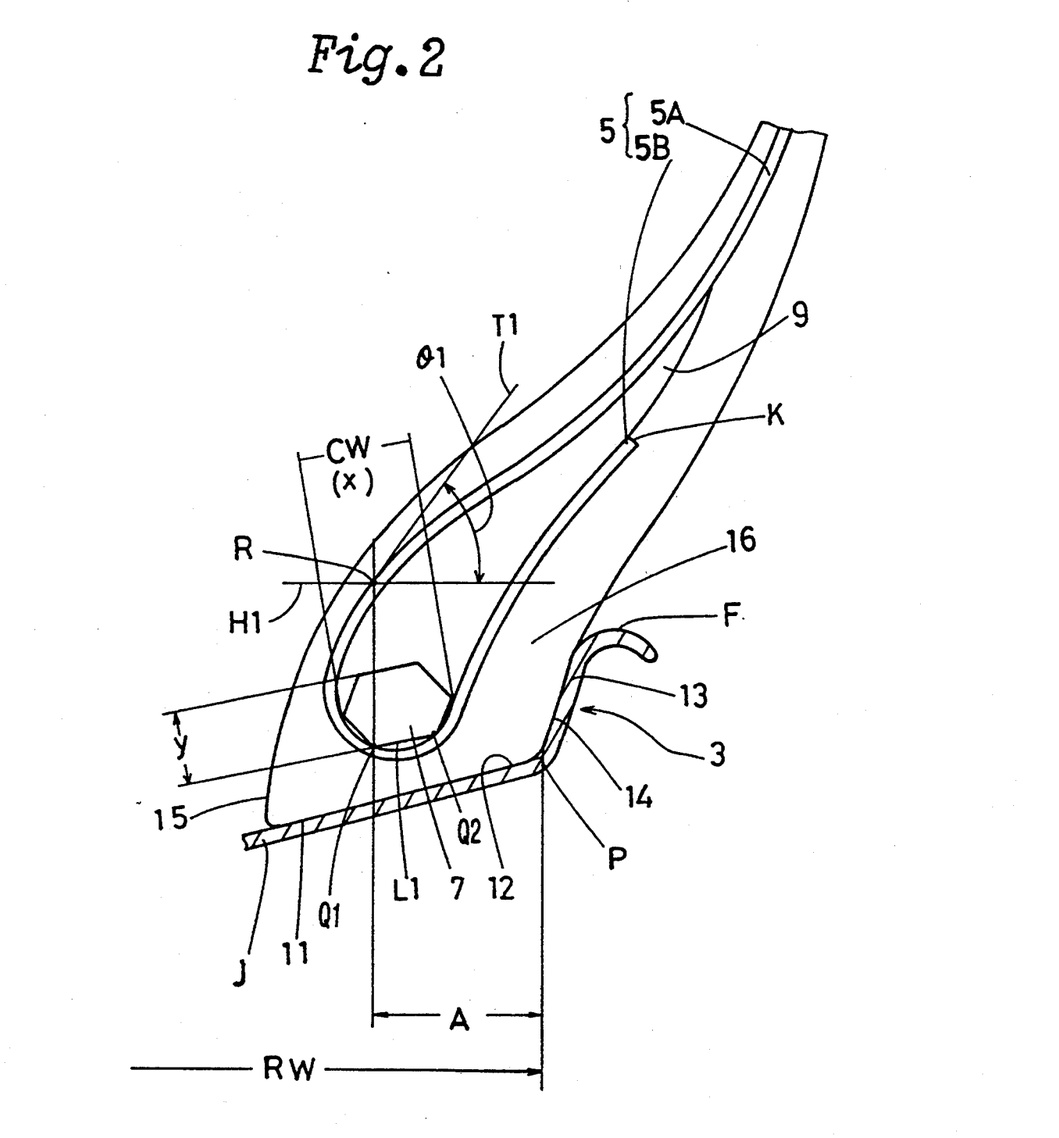
FIG. 2 is an enlarged cross sectional view of the bead portion of FIG. 1.

Each bead portion 4 is provided between the carcass main portion 5A and the turned up portion 5B with a hard rubber bead apex 9 extending radially outwardly from the bead core 7.

In this embodiment, the bead core 7 has a depressed hexagonal cross-sectional shape having six angled points and six sides.

The bead core 7 is located such that its major axis (x) (if regarded as an oval) and one side L1 immediately adjacent to the bead base 11 are in parallel with the bead base 11. Therefore, the side L1 becomes substantially parallel with the bead seat face 12 when the tire 1 is mounted on the rim J and inflated to its regular inner pressure.

The bead core 7 has an aspect ratio of 0.3 to 0.6. Here, the aspect ratio is defined as the ratio (y/CW) between its maximum section width (CW) in the direction of the major axis (x) of the tapered bead base, namely, the length between one extreme end of the bead core to the other extreme end, and its maximum section height (y) in the direction normal to the major axis (x) namely, the length between one extreme end and the other extreme end in the direction perpendicular to L1.

The bead core 7 is formed by winding a steel wire, e.g. a piano wire and the like.

The maximum section width (CW) is in the range of 0.086 to 0.105 times the rim width (RW), the rim width (RW) being defined as the distance between the bead heel points (P). Here, the bead heel point (P) is a point of intersection between the bead base line 11 tapered at 15 degrees and the bead side face line 14.

Further, the axial distance (A) between the bead heel point (P) and the angled point (Q1) at the axially inner end of the above-mentioned side (L1) is in the range of 0.073 to 0.125 times the rim width (RW).

Figure 3:
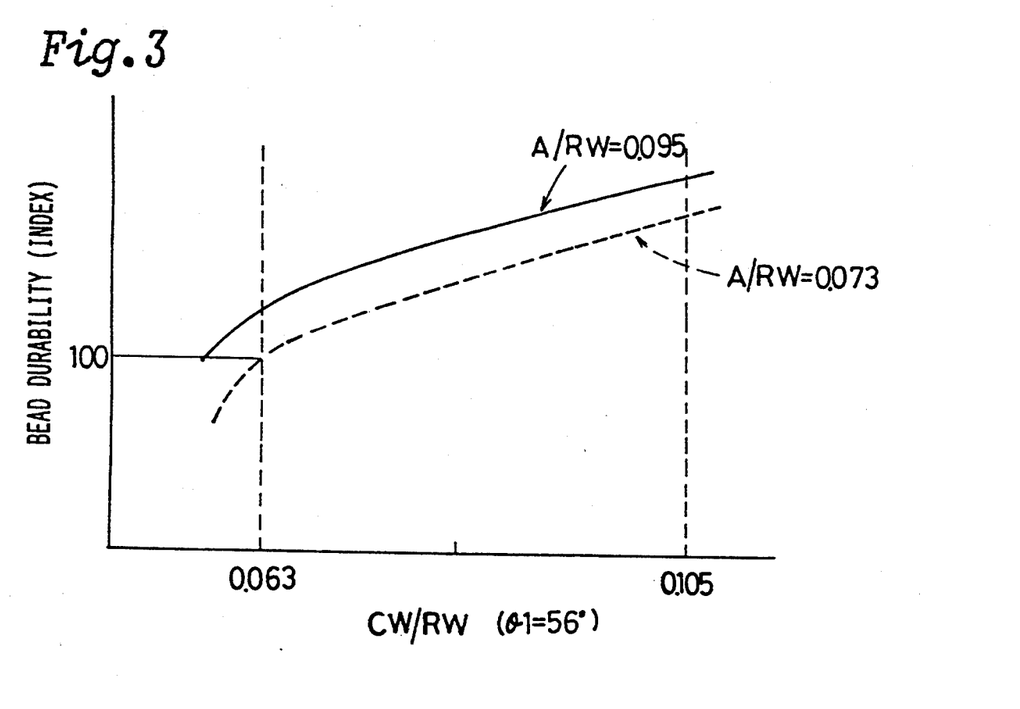
FIG. 3 is a graph showing bead durability as a function of quotient CW/RW.

FIG. 3 shows a relationship between the bead durability and the ratio CW/RW of the maximum section width (CW) to the rim width (RW). When the width (CW) is less than 0.063 times the rim width (RW), the movement of the bead portion against the rim increases and the bead durability is reduced. On other hand, when the quotient CW/RW is more than 0.105, rim mounting becomes difficult.

Figure 4:
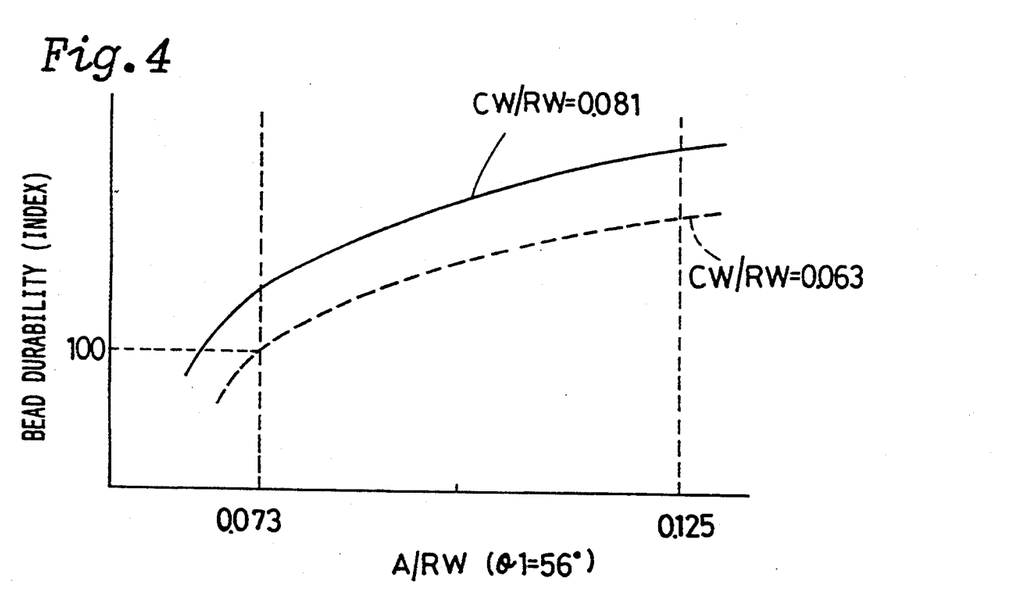
FIG. 4 is a graph showing bead durability as a function of quotient A/RW.

FIG. 4 shows a relationship between the bead durability and the ratio A/RW of the axial distance (A) to the rim width (RW). When the distance (A) is less than 0.073 times the rim width (RW), a rubber layer 16 disposed axially outside the carcass turned up portion 5B becomes liable to be cracked and the bead durability is decreased.

In this embodiment, in the bead portion 4 under the normally inflated condition, the angle $\theta 1$ of a tangential line (T1) to the carcass 5 at a point (R) is set to be not more than 55 degrees with respect to the axial direction. Here, the point (R) is on the axially inside of the carcass 5 at the same axial position as the above-mentioned axially inner angled point (Q1) of the bead core 7.

This was determined based on the following test results.

Figure 5:
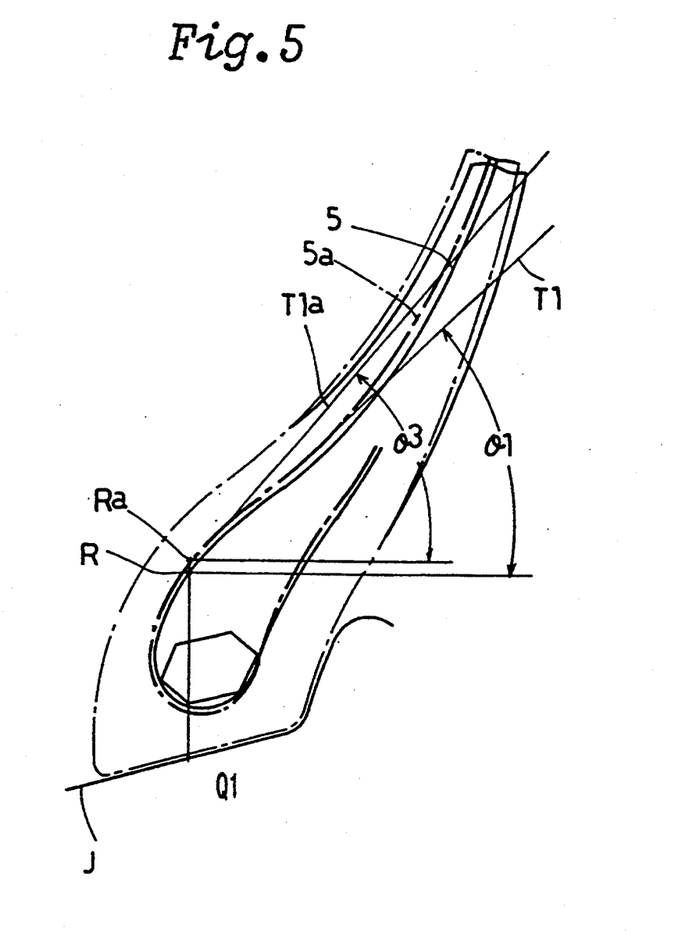
FIG. 5 is a cross sectional view of a bead portion showing the deformation thereof caused during tire inflation.
Figure 6:
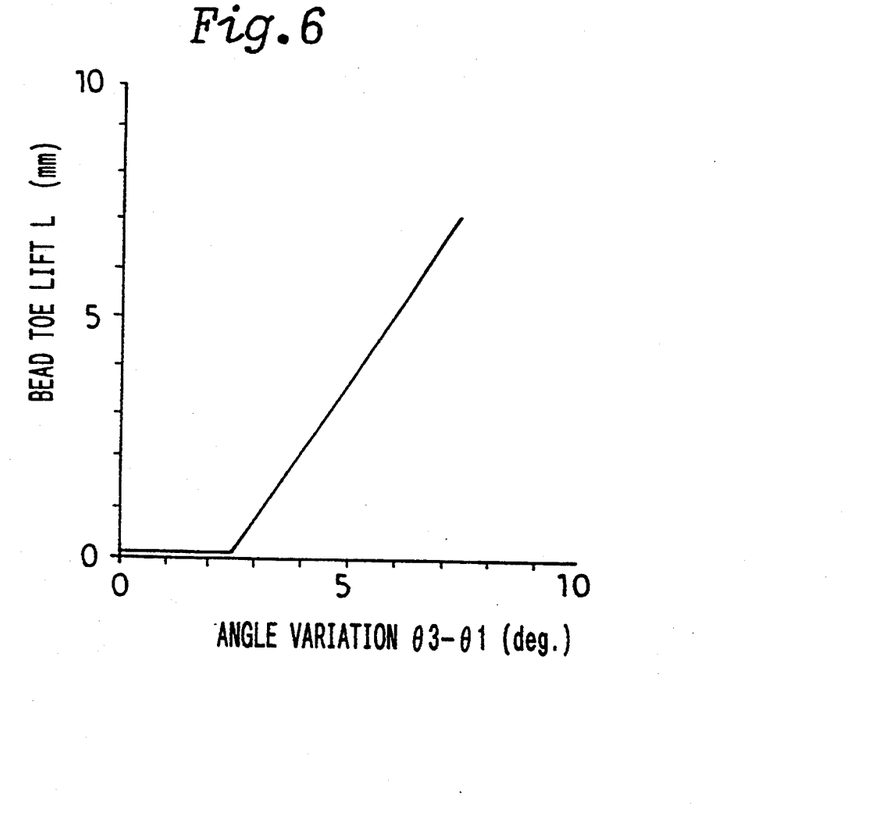
FIG. 6 is a graph showing the amount of bead toe lifting as a function of tangential angle variation $\theta_3 - \theta_1$.

FIG. 5 explains the tangential angle variation $\theta 3 - \theta 1$ when the tire inner pressure is increased from 0.5 kgf/sq.cm to the regular inner pressure, wherein the carcass 5, the tangential line T1, the point R, and the tangential angle $\theta 1$ are at the regular pressure, and 5a, T1a, Ra and $\theta 3$ are at 0.5 kgf/sq.cm. The tangential angles $\theta 1$ and $\theta 3$ and the amount of the bead toe lifting were measured by a X-ray CT-scaner. The results are shown in FIG. 6. As shown in FIG. 6, when the tangential angle variation $\theta 3 - \theta 1$ is less than 2.5 degrees, the amount (L) of toe lifting is substantially zero. When the variation is more than 2.5 degrees, the lifting amount increases in substantially direct proportion to the increase in the tangential angle variation $\theta 3 - \theta 1$.

Figure 7:
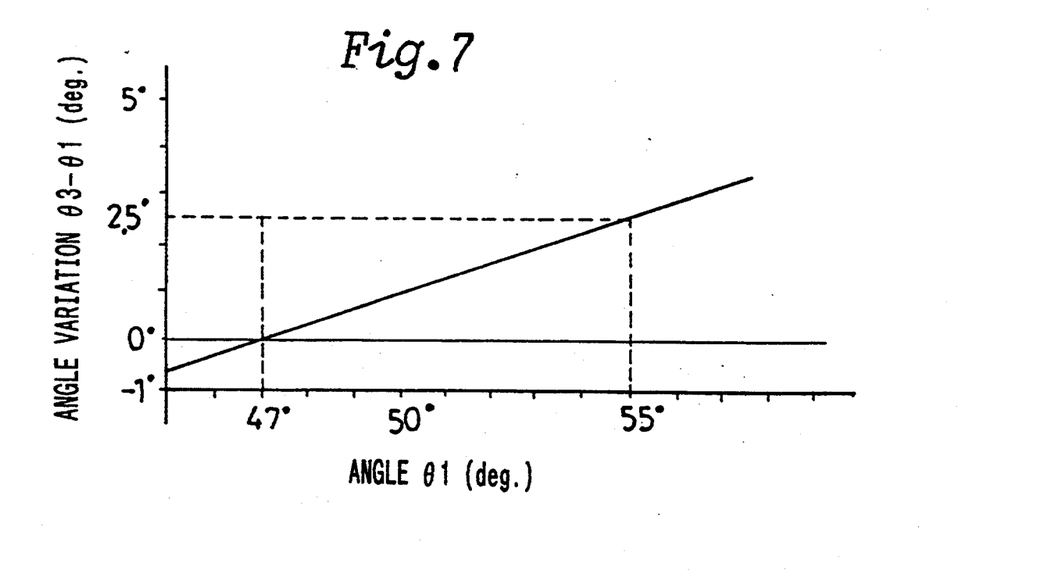
FIG. 7 is a graph showing the tangential angle variation $\theta_3 - \theta_1$ as a function of the tangential angle $\theta_1$.

Further, it was found that the tangential angle variation $\theta 3 - \theta 1$ is in direct proportion to the tangential angle $\theta 1$ as shown in FIG. 7. Therefore, by setting the tangential angle $\theta 1$ less than 55 degrees the tangential angle variation $\theta 3 - \theta 1$ becomes less than 2.5 degrees. As a result, the amount of the bead toe lifting becomes substantially zero. If the tangential angle $\theta 1$ is less than 47 degrees, then the tangential angle variation $\theta 3 - \theta 1$ becomes a negative value, as shown in FIG. 7. In this case, the tangential angle increases as the tire inner pressure increases to the regular inner pressure from 0.5 kgf/sq.cm. Therefore, the compressive stress to which the bead portion 4 is subjected under a loaded condition becomes large and the bead durability is liable to decrease.

Therefore, the tangential angle $\theta 1$ is preferably in the range of 55 to 47 degrees.

Truck/bus radial tires of size 11R22.5 having the structure shown in FIGS. 1 and 2 and specifications set out in Table 1 were prepared.

Each test tire was mounted on its regular rim and inflated to its regular inner pressure and then tested for bead toe lifting and bead durability.

In the durability test, the running distance until the bead portion cracked and/or air leakage was occurred was measured using a drum tester under an inner pressure of 8 kgf/sq.cm, a tire load of 6000 kg, and a speed of 20 km/hr.

The results are indicated in Table 1 by an index based on the assumption that the reference tire is 100. The larger the index, the better the durability.

TABLE 1

|  | Ex.1 | Ex.2 | Ex.3 | Ex.4 | Ref.1 | Ref.2 |
|---|---|---|---|---|---|---|
| Carcass | | | | | | |
| Cord material | | steel | | | steel | |
| Cord angle (deg) | | 90 | | | 90 | |

TABLE 1-continued

| | Ex.1 | Ex.2 | Ex.3 | Ex.4 | Ref.1 | Ref.2 |
|---|---|---|---|---|---|---|
| Belt | | | | | | |
| Cord material | steel | | | | steel | |
| Ply number | 4 | | | | 4 | |
| CW/RW | 0.081 | 0.081 | 0.063 | 0.081 | 0.060 | 0.060 |
| A/RW | 0.095 | 0.095 | 0.073 | 0.095 | 0.070 | 0.070 |
| Tangential angle ($\theta$1) (deg) | 47 | 55 | 56 | 56 | 56 | 55 |
| Bead toe lifting (L) (mm) | 0 | 0 | 0 | 0.5 | 1.2 | 1.2 |
| Bead durability (index) | 103 | 108 | 103 | 105 | 98 | 100 |

It was confirmed from the test results that the working example tires were effectively prevented from toe lifting and improved in durability in comparison with the reference tires.

Figure 8:
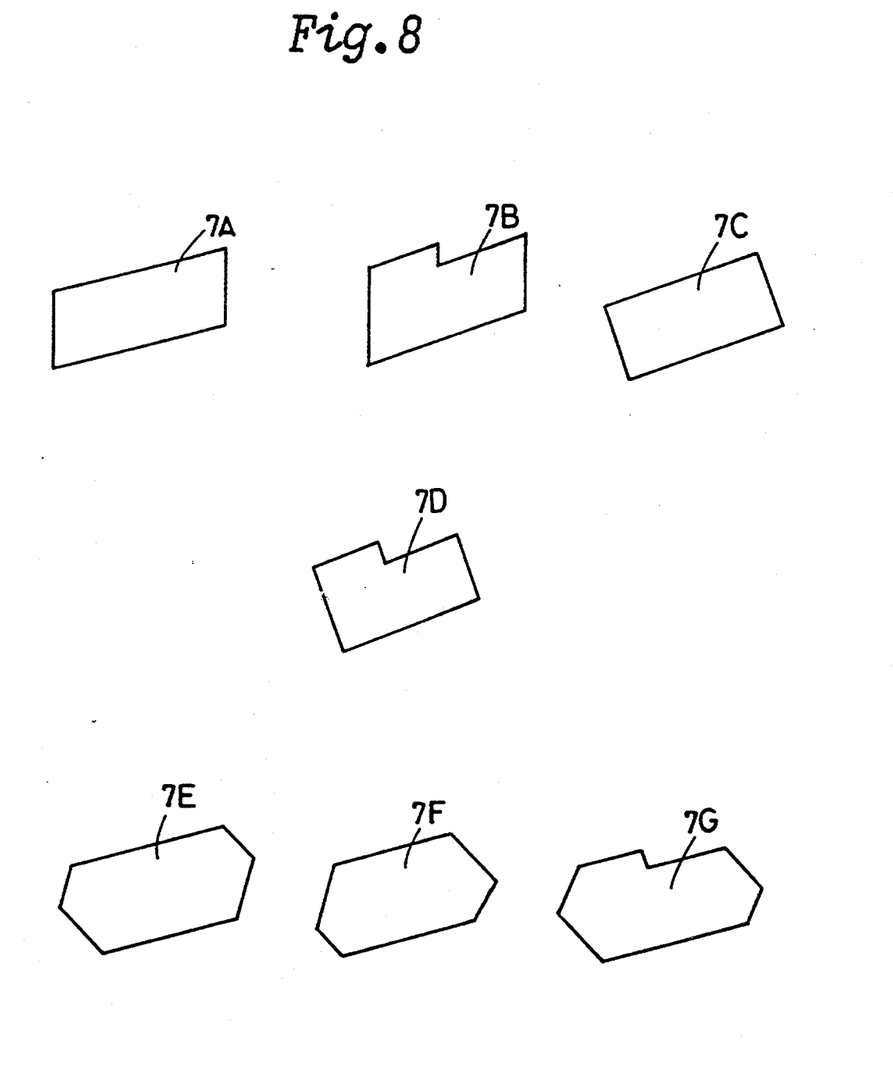
FIG. 8 shows other examples of the cross sectional shape of the bead core.

In the present invention, for the sectional shape of the bead core, various shapes can be used as, for example, shown as 7A to 7G in FIG. 8, in addition to the hexagonal shape shown in FIGS. 1 and 2. The present invention can be applied to tubed tires in addition to tubeless radial tires.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

We claim:

1. A heavy duty radial tire comprising
a tread portion having tread edges,
a pair of axially spaced bead portions, each of the bead portions having a bead base to fit with a 15° tapered bead seat of the tire's regular rim,
a pair of sidewall portions extending between the tread edges and the bead portions,
a bead core disposed in each of the bead portions and having a polygonal cross sectional shape,
a radial carcass extending between the bead portions and turned up around the bead cores, and
a belt disposed radially outside the carcass and radially inside the tread portion,
the polygonal cross sectional shape of the bead core having an axially inner vertex point (Q1) and an axially outer vertex point (Q2) and a side (L1) extending between the points (Q1 and Q2), the side (L1) being adjacent to and substantially parallel with the bead base,
the maximum section width (CW) of the bead core in the direction parallel with the side (L1) being in the range of 0.063 to 0.105 times the rim width (RW), the rim width (RW) being defined as the distance between a pair of bead heel points (P),
the axial distance (A) of the axially inner vertex point (Q1) from the bead heel point (P) being 0.073 to 0.125 times the rim width (RW), wherein
the difference $\theta3-\theta1$ between tangential angle $\theta3$ and tangential angle $\theta1$ of the carcass is less than 2.5 degrees, the tangential angle $\theta1$ being measured at a point (R) on the axially inside of the carcass at the same axial position as the inner point (Q1) when the tire is inflated to its regular pressure, the tangential angle $\theta3$ being measured at a point (Ra) on the axially inside of the carcass at the same axial position as the inner point (Q1) when the tire pressure is 0.5 kgf/cm$^2$, and
the tangential angle $\theta1$ is in the range of 55 to 47 degrees with respect to the tire axial direction.

2. The heavy duty radial tire according to claim 1, wherein the aspect ratio of the cross sectional shape of the bead core is in the range of 0.3 to 0.6.

3. The heavy duty radial tire according to claim 1, wherein the cross sectional shape of the bead core is a hexagon.

4. A heavy duty radial tire and rim combination comprising
a rim, the rim including a rim flange and a pair of 15° tapered bead seats, and
a tire, the tire comprising
a tread portion having tread edges,
a pair of axially spaced bead portions, each of the bead portions having a bead base to fit with one of the 15° tapered bead seats,
a pair of sidewall portions extending between the tread edges and the bead portions,
a bead core disposed in each of the bead portions and having a polygonal cross sectional shape,
a radial carcass extending between the bead portions and turned up around the bead cores, and
a belt disposed radially outside the carcass and radially inside the tread portion,
the polygonal cross sectional shape of the bead core having an axially inner vertex point (Q1) and an axially outer vertex point (Q2) and a side (L1) extending between the points (Q1 and Q2), the side (L1) being adjacent to and substantially parallel with the bead base,
the maximum section width (CW) of the bead core in the direction parallel with the side (L1) being in the range of 0.063 to 0.105 times the rim width (RW), the rim width (RW) being defined as the distance between a pair of bead heel points (P),
the axial distance (A) of the axially inner vertex point (Q1) from the bead heel point (P) being 0.073 to 0.125 times the rim width (RW), wherein
the difference $\theta3-\theta1$ between tangential angle $\theta3$ and tangential angle $\theta1$ of the carcass is less than 2.5 degrees, the tangential angle $\theta1$ being measured at a point (R) on the axially inside of the carcass at the same axial position as the inner point (Q1) when the tire is inflated to its regular pressure, the tangential angle $\theta3$ being measured at a point (Ra) on the axially inside of the carcass at the same axial position as the inner point (Q1) when the tire pressure is 0.5 kgf/cm$^2$, and
the tangential angle $\theta1$ is in the range of 55 to 47 degrees with respect to the tire axial direction.

5. The combination according to claim 4, wherein the aspect ratio of the cross sectional shape of the bead core is in the range of 0.3 to 0.6.

6. The combination according to claim 4, wherein the aspect ratio of the cross sectional shape of the bead core is a hexagon.

* * * * *